United States Patent [19]

Reinartz et al.

[11] Patent Number: 5,005,350

[45] Date of Patent: Apr. 9, 1991

[54] TANDEM MASTER CYLINDER

[75] Inventors: Hans-Dieter Reinartz, Frankfurt am Main; Helmut Steffes, Hattersheim; Holger Von Hayn, Bad Vilbel; Thomas Meier, Frankfurt am Main, all of Fed. Rep. of Germany

[73] Assignee: Alfred Teves GmbH, Frankfurt, Fed. Rep. of Germany

[21] Appl. No.: 420,181

[22] Filed: Oct. 12, 1989

[30] Foreign Application Priority Data

Oct. 18, 1988 [DE] Fed. Rep. of Germany ....... 3835394

[51] Int. Cl.$^5$ ............................................. B60T 11/20
[52] U.S. Cl. ......................................... 60/562; 60/589
[58] Field of Search ................................ 60/562, 589

[56] References Cited

U.S. PATENT DOCUMENTS 4,201,054 5/1980 Bainbridge ............................ 62/562

FOREIGN PATENT DOCUMENTS 8335919 4/1984 Fed. Rep. of Germany .
3424513 1/1986 Fed. Rep. of Germany .
968958 9/1964 United Kingdom .

Primary Examiner—Ronald C. Capossela
Attorney, Agent, or Firm—Robert P. Seitter; J. Gordon Lewis

[57] ABSTRACT

A tandem master cylinder for hydraulic brake systems of automotive vehicles. The push-rod piston (29) and the floating piston (34) both are provided with a central valve. The central valve of the push-rod piston is coupled to the floating piston. The length of the bore (28) of the central valve in the push-rod piston (29) is dimensioned to allow the valve closure member (27) of the central valve in the push-rod piston to travel a distance within the bore of the central valve at least equal to the stroke of the floating piston (34).

7 Claims, 3 Drawing Sheets

TANDEM MASTER CYLINDER

BACKGROUND OF THE INVENTION

This invention relates to a tandem master cylinder for hydraulic brake systems of automotive vehicles of the type having central valves in the push-rod piston and in the floating piston. Preferably, the central valve in the push-rod piston is coupled to the floating piston. The gasket of the tandem master cylinder and the central valve in the floating piston can be tested for leakage by pressurizing the pressure chamber of the push-rod piston with a pressure fluid which is supplied through the connection to the reservoir where the pressure fluid is stored.

German Published Patent Application (Deutsche Offenlegungsschrift) No. 36 29 564 describes a brake system having a slip control arrangement consisting of a pedal-operated braking pressure generator which is preferably auxiliary-energy-assisted. The wheel brakes are connected to the braking pressure generator via pressure lines of a hydraulic auxiliary pressure supply system which also includes a hydraulic pump, a pressure-compensation-and-pressure-fluid storage reservoir, with an auxiliary pressure control valve, and wheel sensors and electronic circuits for detecting the rotational behavior of the wheels and for generating electric braking pressure control signals which control electromagnetically operable pressure fluid inlet valves and outlet valves. The inlet valves and the outlet valves, located in the pressure fluid line effect slip control. The brake system of German Published Patent Application No. 36 29 564 is characterized by a switch which is located into the pressure line of the auxiliary energy source and operates after a predetermined hydraulic pressure has been reached to emit an electric signal to the signal processing and control circuit. This, in turn, causes the motor of the pump to switch on and off for the purpose of developing a checking cycle which signals the driver of the vehicle via a visual or acoustic indication that the pump-and-motor unit is ready for operation.

U.S. Pat. Application Ser. No. 367,156, filed June 16, 1989 and entitled "Method for Assembling a Piston-and-Cylinder Unit with a Force Transmission Element" corresponds to German Patent Application No. P 38 23 630.3 and describes a method for assembling a piston-and-cylinder unit with a force transmission element such as a pressure element. The unit has, at least, a pressure piston with a valve element which opens or closes the pressure chamber associated with the piston depending on the movement of the pressure piston. U.S. Patent Application Ser. No. 367,156 suggests that, in order to reduce the lost travel of the spring-loaded closure member and/or of the spring-loaded valve seat of the valve element, the pressure piston be moved against a spring force with a force to be measured which undergoes a marked increase due to the closing operation of the valve element and that the travel of the piston from its initial position up to the marked increase in force be used for selecting one or a plurality of spacers to be positioned between the force transmission element and the piston in order to reduce the lost travel.

Prior art tandem master cylinders have been arranged to permit conducting the so-called probe test. This test involves the pressurization of the pressure chamber associated with the push-rod piston to test the gaskets of the tandem master cylinder for leakage and to test the central valve in the floating piston of the tandem master cylinder for leakage, with the tandem master cylinder mounted on the vehicle. This test, for example, is performed by the automobile manufacturer.

The following steps are carried out in the probe test. With the tandem master cylinder mounted in place on the vehicle, a test probe is pressed onto the storage reservoir return bore of the push-rod piston. Pressure fluid is forced at a high pressure into the pressure chamber of the push-rod piston through the return bore and the hydraulic passages downstream from the return bore. As a result of the pressure in the push-rod piston, the floating piston will move toward the bottom of the tandem master cylinder, while the push-rod piston will remain still. A problem with prior art tandem master cylinders has been that, during the probe test, the closure member of the central valve of the push-rod piston is pulled out of the push-rod piston. This can cause damage to, or a complete failure of, the tandem master cylinder, so that proper operation of the tandem master cylinder cannot be assured.

SUMMARY OF THE INVENTION

One object of the present invention is to provide a tandem master cylinder having the push-rod piston central valve coupled to the floating piston and which is suitable for a probe test.

A further object of the present invention is to provide a method for adjusting the push-rod piston to the vacuum brake booster in a simple manner to reduce the closing travel of the central valve of the push-rod piston.

Another object of the present invention is to provide a tandem master cylinder in which the closing travel of the central valve of the push-rod piston circuit and the lost travel associated therewith are minimized.

Yet another object of the present invention is to provide a tandem master cylinder which avoids the problem of excessive lost travel of the central valve in prior art tandem master cylinders which results from the cumulative effect of many tolerances of the individual tandem master cylinder components.

Still another object of the present invention is to provide a tandem master cylinder which avoids the problem of intolerable excessive lost travel of the brake pedal which results from the combined effects of the pedal transmission ratio and the lost travel of the central valve in prior art tandem master cylinders.

These objects are achieved by the present invention by dimensioning the length of the bore of the central valve in the push-rod piston so that the valve closure member of the central valve in the push-rod piston moves within the bore of the central valve over a distance at least equal to the stroke of the floating piston to which the closure member is connected.

In a preferred embodiment of the present invention, which provides favorable cost benefits, the pressure element of the push-rod piston is arranged to serve as a stop for the push-rod piston during the leak test. This minimizes the play which can develop between stop washers and the push-rod piston upon assembly with the brake booster because the pressure element serves as the stop member.

During the pressure probe test, the pressure fluid also acts on the push-rod piston which is moved in the direction of the booster. The play is equal to the stroke. This may result in damage to the vacuum brake booster because of the force applied by the push-rod. This problem is avoided by the present invention and, in particular, by the preferred embodiment just described.

Another aspect of the present invention is a method for adjusting the push-rod piston of a tandem master cylinder of the type under consideration to a vacuum brake booster with the objective of reducing the closing travel of the central valve in the push-rod piston. This method involves allowing the compression spring which is arranged in the pressure chamber of the push-rod piston to expand as far as it is permitted by the stop element of the closure member of the central valve in the push-rod piston and with this spring expanded, the distance between a flange surface of the tandem master cylinder housing and the bottom of the pressure element bore is measured. The number or thickness of one or of a plurality of spacers to be arranged between the pressure element and the push-rod piston are selected from the distance measurement.

A device useful in carrying out the method just described is a sleeve attached to an end of the tandem master cylinder which effectively lengthens the bore of the tandem master cylinder.

DESCRIPTION OF THE PRIOR ART

Figure 1:
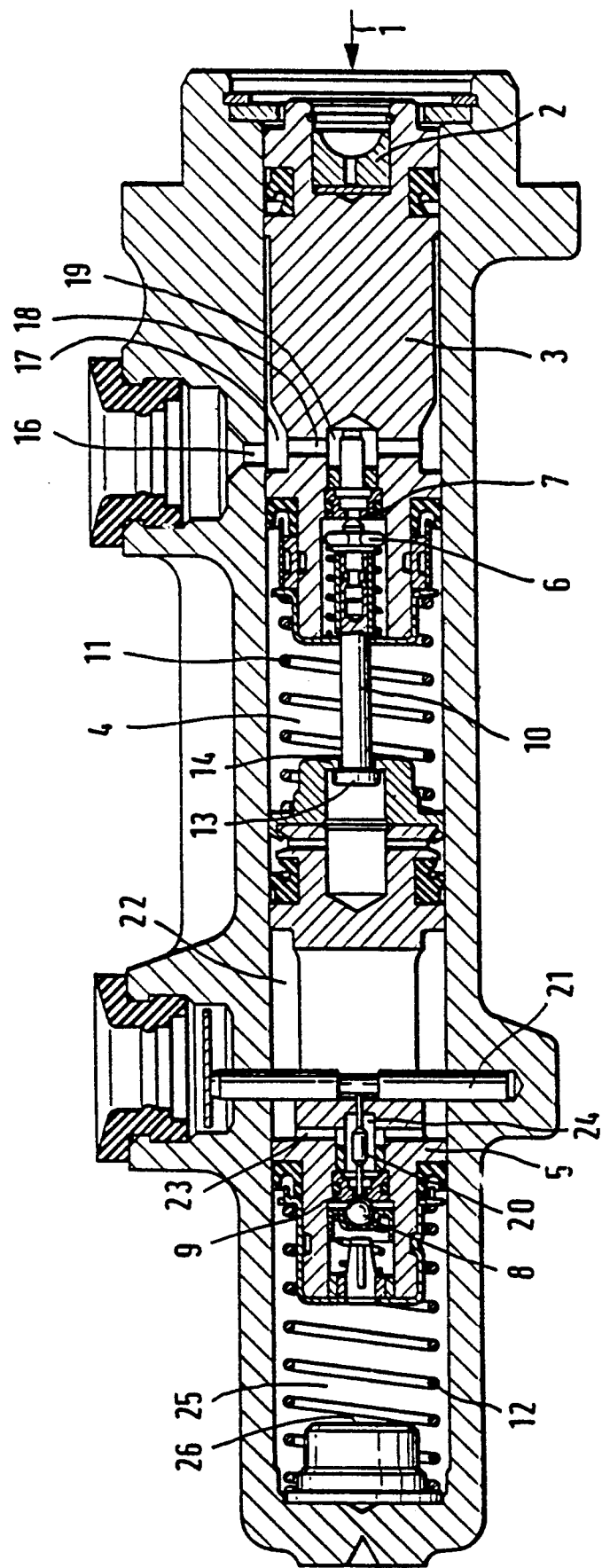
FIG. 1 is a vertical section view of a prior art tandem master cylinder.

The tandem master cylinder shown in FIG. 1 corresponds to the one described and illustrated in U.S. Pat. Application Ser. No. 367,156. A vacuum brake booster (not shown) exerts a force on the pressure element 2 of the tandem master cylinder in the direction of the arrow 1 causing the push-rod piston 3 to move to the left. A pressure builds up in the pressure chamber 4. This pressure displaces the floating piston 5 likewise to the left.

The valve closure member 6 in the push-rod piston becomes seated on the valve seat 7 at the commencement of the movement to the left of the push-rod piston. In the same manner, the ball-design valve closure member 8 in the floating piston 5 seats on the valve seat 9.

As seen in FIG. 1, the central valve in the push-rod piston is coupled to the floating piston. The closure member 6 is linked to the pin 10. Upon a release of the brake, the pressure of the compression springs 11 and 12 causes the push-rod piston to move to the right. The valve closure member 6, held by the pin 10, lifts off from the valve seat 7. The coupling is effected by the pin 10 acting as a tension element, the pin 10 having an expanded head 13 at its left end which abuts against a stop 14 of the floating piston.

With the brake released and the central valve in the push-rod piston open, pressure fluid can be supplied into pressure chamber 4 via the supply bore 16, the annular chamber 17, the radial channels 18, the chamber 19 and the pressure fluid passage which is formed between the valve seat and the valve closure member when the central valve is open.

When the brake is released, the floating piston 5 moves to the right under the action of the compression spring 12. The pin 20 abuts the cross pin 21 causing the valve closure member 8 to lift off from the valve seat 9. Thus, the pin 20 acts as a pressure element.

Pressure fluid flows from the storage reservoir into the chamber 22 via a supply bore and further into the pressure chamber 25 of the floating piston via the radial bores 23, the chamber 24 and the pressure fluid passage which is formed between the valve seat and the ball when the central valve in the floating piston is open.

As indicated above, one object of the present invention is to permit conducting probe tests on tandem master cylinders having a central valve in the push-rod piston which is coupled to the floating piston. By means of the probe test, the mounted tandem master cylinder can be tested for leakage of the gaskets and the central valve of the floating piston can be tested.

In the probe test, a test probe is pressed into the supply bore 16, or into the return bore of the reservoir. Pressure fluid is introduced into the pressure chamber 4 of the push-rod piston at a high pressure, such as 100 bar, via the bore 16 and the pressure fluid passages downstream from this bore. As a result of the pressure in chamber 4, the floating piston 5 moves toward the bottom 26 of the tandem master cylinder. The push-rod piston remains still. This can cause the closure member 6 of the central valve of the push-rod piston which is coupled to the floating piston to be pulled out of the push-rod piston, thereby causing damage to the various components. Thus, proper operation of the tandem master cylinder cannot be assured after such a probe test.

DETAILED DESCRIPTION OF THE INVENTION

Figure 2:
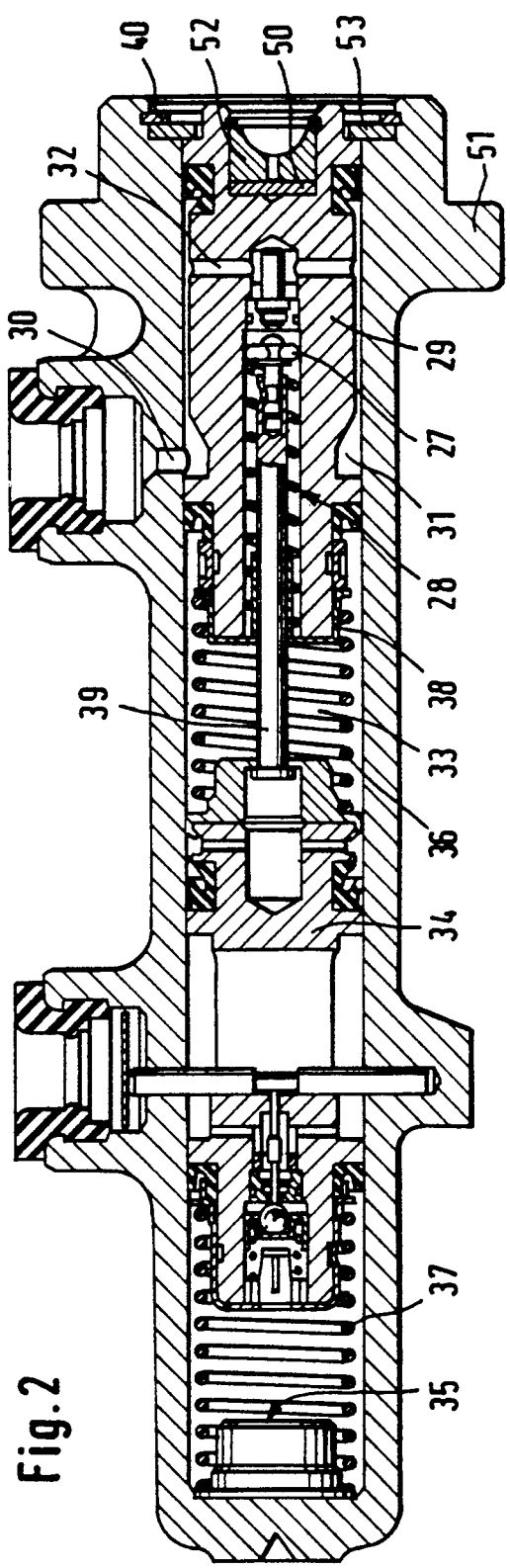
FIG. 2 is a vertical section view of a preferred embodiment of the present invention showing a completely assembled tandem master cylinder.

FIG. 2 shows a bore 28 in the push-rod piston 29 which extends more deeply into the push-rod piston than the bore in the push-rod piston in FIG. 1. With this arrangement, the stroke of the closure member 27 of the central valve of the push-rod piston is considerably longer than in the prior art tandem master cylinder illustrated in FIG. 1.

When a probe test is conducted, pressure fluid entering the pressure chamber 33 via the bore 30, the annular chamber 31, the radial bore 32 and the open central valve of the push-rod piston, causes the floating piston 34 to move to the left until it abuts against the bottom 35 of the tandem master cylinder. Because of the long stroke of the closure member 27 in the lengthened bore 28, the closure member can move along with the floating piston without the closure member being pulled out of the push-rod piston. The valve closure member 27 is coupled to the floating piston 34 in the manner explained with reference to FIG. 1, namely by means of an enlarged head on the left end of the pin 39 which abuts against stops in the floating piston.

Springs 36 and 37 are arranged to cooperate so that the bowl-type spring retainer 38 will remain on the push-rod piston during a probe test and yet assure normal operation of the tandem master cylinder at other times.

The central valve bore of the push-rod piston 29 of FIG. 2 extends into the push-rod piston by at least the stroke required during the probe test. The length of the pin 39 of the central valve of the push-rod piston, which serves as a tension element for the valve body, is increased accordingly.

Figure 3:
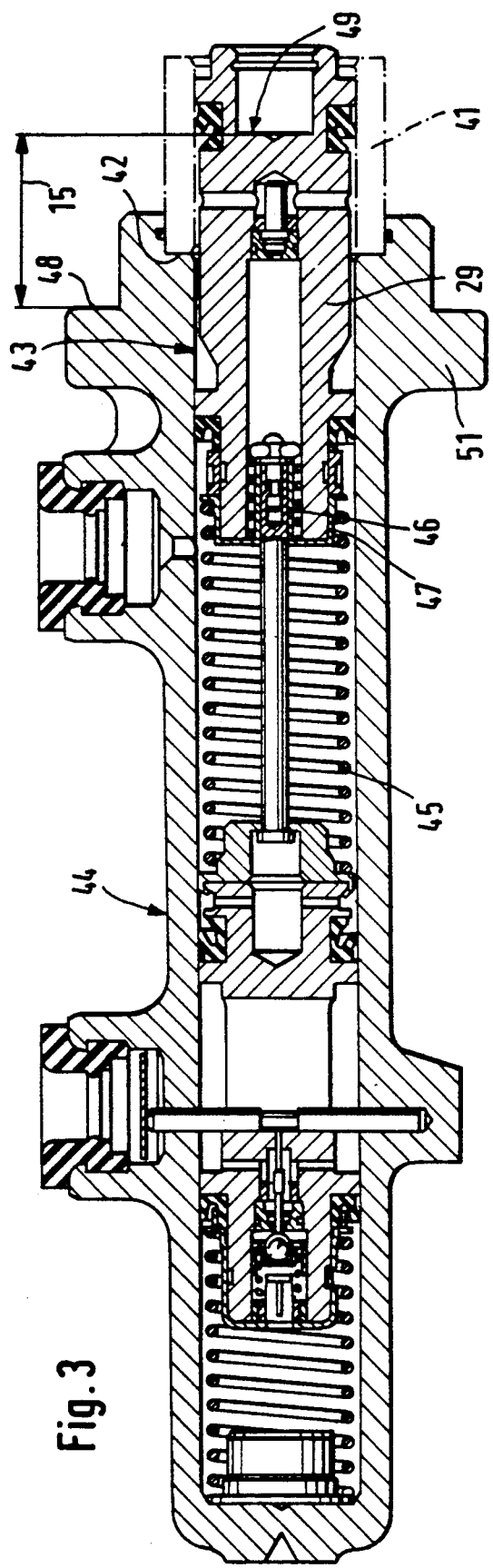
FIGS. 3 and 4 are vertical section views which show the components for adjusting the push-rod piston of the tandem master cylinder to the vacuum brake booster with which the tandem master cylinder is to be used.

A method for adjusting the push-rod piston to an associated vacuum brake booster will be described with reference to FIG. 3. Such adjustment is necessary to reduce the closing travel of the central valve of the push-rod piston. As indicated previously, excessive closing travel or lost travel of the central valve is undesirable because, when combined with the brake pedel linkage, it results in an excessive lost travel of the brake pedal.

The adjustment of the push-rod piston to the vacuum brake booster to result in minimum lost travel of the central valve in the push-rod piston begins prior to the retaining ring 40 (shown FIG. 2) being set in the tandem master cylinder housing. Referring to FIG. 3, an assembly sleeve 41 is placed on the right-hand end of the tandem master cylinder housing. This sleeve centers itself on the shoulder 42 of the tandem master cylinder housing and by such placement of the sleeve, the length of the bore 43 of the tandem master cylinder housing 44 is extended. The spring 45 of the push-rod piston expands to the extent permitted by the sleeve 46. The sleeve abuts against the bowl-type spring retainer 47. Thus, spring 45 of the push-rod piston expands until the valve closure member 27 has moved the sleeve 46 against the bowl-type spring retainer which acts as a stop. At this point, the sleeve 46 is clamped between the overhanging valve closure member 27 and the bowl-type spring retainer. The gauge 15 determines the distance between the flange surface 48 of the tandem master cylinder housing and the bottom 49 of the pressure element bore which, in turn, determines the number and/or thickness of the spacing washers 50 which are shown in FIG. 2. The flange is identified by reference numeral 51 and the pressure element is identified by reference numeral 52 in FIG. 3.

The push-rod piston, after such adjustment, is moved to its operating position and secured by insertion of the stop washer 53 and the retaining ring 40 which are shown in FIG. 2.

Figure 4:
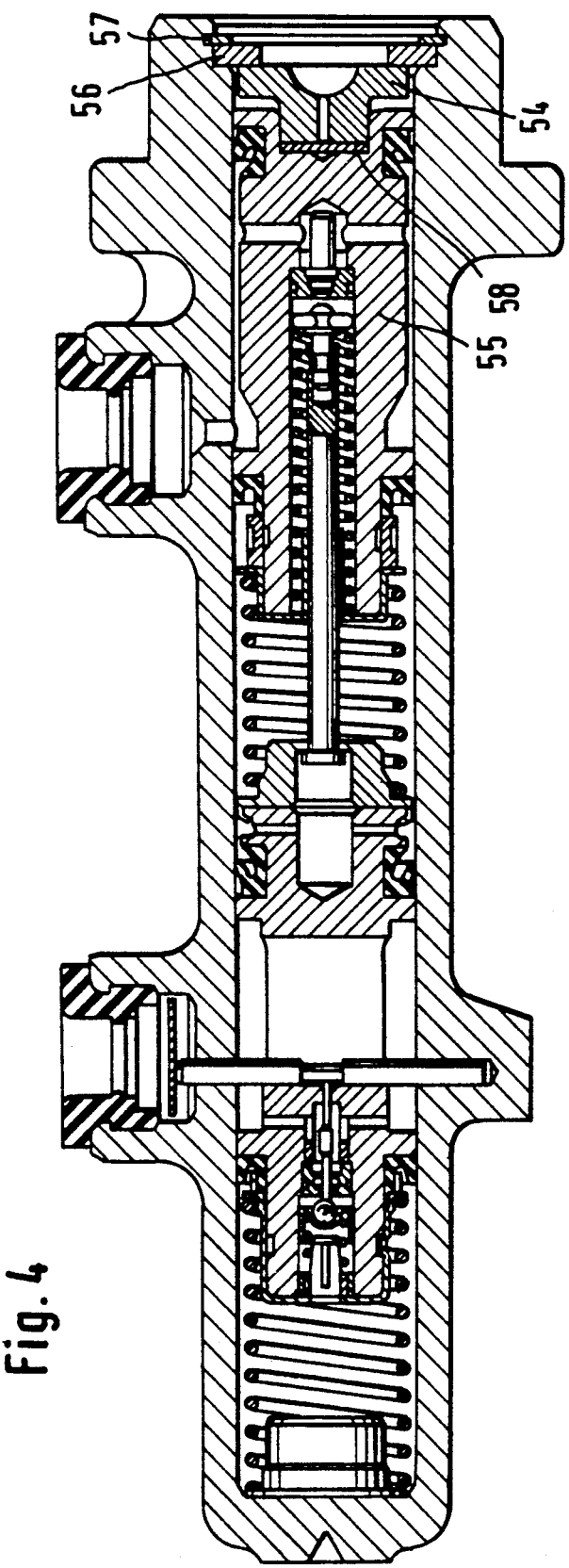

In FIG. 4, the pressure element 54, together with the stop washer 56 and the retaining ring 57, functions to secure the push-rod piston 55 during the pressure probe test.

The method for adjusting the push-rod piston to the vacuum brake booster described in U.S. Pat. Application Ser. No. 367,156 can be employed for the tandem master cylinder shown in FIG. 4 to reduce the closing travel of the central valve in the push-rod piston of this tandem master cylinder. In accordance with this method, the gauge measurement is based on determining just when the central valve in the push-rod piston closes. Subsequently, on the basis of this gauge measurement, the spacing washers 58 which are to be arranged between the pressure element 54 and the push-rod piston 55 are selected.

What is claimed is:

1. A tandem master cylinder comprising:
   a housing having an axial bore which is closed at one end and open at the opposite end, said open end of said axial bore adapted for connection to a vacuum brake booster;
   a pressure element positioned in said axial bore in said housing at said open end of said axial bore and adapted to respond to forces exerted by a vacuum brake booster;
   a floating piston movable along said axial bore in said housing and having a valve which closes upon movement of said floating piston toward said closed end of said axial bore and opens upon movement of said floating piston toward said open end of said axial bore;
   a push-rod piston movable along said axial bore in said housing in response to responses of said pressure element to forces exerted by a vacuum brake booster and having a valve which closes upon movement of said push-rod piston toward said closed end of said axial bore and opens upon movement of said push-rod piston toward said open end of said axial bore, said valve in said push-rod piston including:
   (a) a valve bore extending along said axial bore in said housing and having an open end facing said floating piston,
   (b) a closure member rigidly connected to said floating piston and movable along said valve bore toward said open end of said valve bore as said floating piston moves toward said closed end of said axial bore in said housing, and
   (c) a valve seat positioned in said valve bore at a point which permits movement of said closure member over a distance within said valve bore which is at least as great as the maximum stroke of said floating piston;
   a first spring positioned between said floating piston and said closed end of said axial bore in said housing and urging said floating piston away from said closed end of said axial bore;
   a second spring positioned between said floating piston and said push-rod piston urging separation of said floating piston and said push-rod piston;
   and means for supplying a pressure medium to said floating piston and said push-rod piston to conduct pressure medium to a chamber in said axial bore in said housing between said floating piston and said closed end of said axial bore when said valve in said floating piston is open and to a chamber in said axial bore in said housing between said floating piston and said push-rod piston when said valve in said push-rod piston is open.

2. A tandem master cylinder according to claim 1 wherein said closure member of said valve in said push-rod piston is connected to said floating piston by a pin having a head which is held captive in said floating piston.

3. A tandem master cylinder according to claim 1 wherein said push-rod piston is positioned against said pressure element.

4. A tandem master cylinder according to claim 1 wherein said push-rod piston further includes a sleeve positioned within said valve bore at said open end of said valve bore and said closure member abuts against said sleeve as said closure member moves toward said open end of said valve bore to limit movement of said closure member.

5. A tandem master cylinder according to claim 4 wherein the distance between said valve seat and said sleeve is at least as great as the maximum stroke of said floating piston.

6. A method for adjusting the push-rod piston of a tandem master cylinder as set forth in claim 1 to a vacuum brake booster with the objective of reducing the closing travel of the central valve in the push-rod piston, said method comprising allowing said second spring to expand as far as it is permitted by a stop element for the closure member of the valve in the push-rod piston, measuring the distance between a flange surface of said housing and the bottom of a bore in said pressure element and selecting the number or the thickness of one or of a plurality of spacers to be arranged between the pressure element and the push-rod piston in accordance with the distance determination.

7. A method as according to claim 6, further including placing an assembly sleeve at an end of said housing to axially lengthen the bore of said housing during the period of adjusting the push-rod piston.

* * * * *